US012755257B2

(12) United States Patent
Bakshi et al.

(10) Patent No.: US 12,755,257 B2
(45) Date of Patent: Oct. 6, 2026

(54) GENERATING SMART CONTRACTS FOR ELECTRONIC NOTARIZATION USING SYNTHETICALLY GENERATED INVISIBLE FINGERPRINT METADATA

(71) Applicant: Bank of America Corporation, Charlotte, NC (US)

(72) Inventors: Sakshi Bakshi, New Delhi (IN); Durga Prasad Kutthumolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/869,247

(22) Filed: Jul. 20, 2022

(65) Prior Publication Data

US 2024/0029034 A1 Jan. 25, 2024

(51) Int. Cl.

| | |
|---|---|
| ***G06Q 50/18*** | (2012.01) |
| ***G06F 21/32*** | (2013.01) |
| ***G06F 21/64*** | (2013.01) |
| ***G06Q 10/10*** | (2023.01) |
| ***G06Q 20/02*** | (2012.01) |
| ***G06Q 20/38*** | (2012.01) |
| ***G06Q 30/018*** | (2023.01) |
| ***G06Q 40/00*** | (2023.01) |
| ***G06Q 50/26*** | (2024.01) |

(52) U.S. Cl.
CPC ........... *G06Q 20/02* (2013.01); *G06Q 20/389* (2013.01)

(58) Field of Classification Search
CPC .. G06Q 20/02; G06Q 20/389; G06Q 2220/00; G06Q 30/018; G06Q 40/00; G06Q 10/10; G06Q 50/18; G06Q 50/26; G06F 21/32; G06F 21/64
See application file for complete search history.

(56) References Cited

U.S. PATENT DOCUMENTS

| | | | | |
|---|---|---|---|---|
| 9,280,792 | B2 * | 3/2016 | Xiao | G06Q 40/04 |
| 9,672,487 | B1 * | 6/2017 | Garcia | G06Q 10/06 |
| 9,824,351 | B2 * | 11/2017 | Pruthi | H04L 63/08 |
| 10,671,712 | B1 * | 6/2020 | Lindley | H04L 9/3247 |

(Continued)

FOREIGN PATENT DOCUMENTS

| | | | | |
|---|---|---|---|---|
| CN | 111213139 A | * | 5/2020 | H04L 9/50 |
| KR | 20060095777 A | * | 9/2006 | G06F 1/1686 |

(Continued)

*Primary Examiner* — Matthew S Gart
*Assistant Examiner* — Tony P Kanaan
(74) *Attorney, Agent, or Firm* — Banner & Witcoff, Ltd.

(57) ABSTRACT

Aspects of the disclosure relate to generating smart contracts for electronic notarization using synthetically generated invisible fingerprint metadata. An apparatus may receive synthetic fingerprint information. In addition, the synthetic fingerprint information may be generated based on one or more physical fingerprint images of a user and using a generative artificial intelligence algorithm. The apparatus may receive one or more digital documents associated with an electronic notarization. The apparatus may receive rule information corresponding to location specific protocols associated with the electronic notarization. The apparatus may generate a smart contract on a blockchain based on the synthetic fingerprint information, the one or more digital documents, and the rule information.

5 Claims, 12 Drawing Sheets

(56) References Cited

U.S. PATENT DOCUMENTS

| | | | | |
|---|---|---|---|---|
| 11,416,944 | B1* | 8/2022 | Floyd | G06F 16/27 |
| 2006/0095777 | A1* | 5/2006 | Brekke | G06Q 30/06 713/176 |
| 2008/0250241 | A1* | 10/2008 | Ginter | H04N 21/6581 375/E7.009 |
| 2009/0006860 | A1* | 1/2009 | Ross | H04L 63/126 713/168 |
| 2013/0198104 | A1* | 8/2013 | Parker | G06Q 10/10 705/342 |
| 2014/0288997 | A1* | 9/2014 | Schultz | G06Q 10/0635 705/7.28 |
| 2015/0142968 | A1 | 5/2015 | Bhagwat et al. | |
| 2015/0189030 | A1 | 7/2015 | Li | |
| 2015/0382151 | A1* | 12/2015 | Pariani | G06Q 10/00 455/456.3 |
| 2017/0024993 | A1 | 1/2017 | Lee | |
| 2017/0188178 | A1 | 6/2017 | Vrabete | |
| 2017/0243193 | A1* | 8/2017 | Manian | G06Q 20/3829 |
| 2017/0257664 | A1 | 9/2017 | Tam et al. | |
| 2017/0293723 | A1* | 10/2017 | Friesen | G06Q 10/10 |
| 2017/0300872 | A1* | 10/2017 | Brown | G06Q 20/401 |
| 2017/0301047 | A1* | 10/2017 | Brown | G06Q 20/02 |
| 2017/0352012 | A1* | 12/2017 | Hearn | G06Q 40/12 |
| 2018/0212787 | A1 | 7/2018 | Lee et al. | |
| 2019/0171849 | A1* | 6/2019 | Assenmacher | G06F 16/9014 |
| 2019/0172041 | A1* | 6/2019 | Hill | G06Q 20/202 |
| 2019/0253240 | A1* | 8/2019 | Treat | H04L 9/3297 |
| 2019/0273607 | A1* | 9/2019 | Van Der Velden | H04L 9/088 |
| 2019/0319977 | A1* | 10/2019 | Gottschlich | G06F 18/214 |
| 2019/0332983 | A1* | 10/2019 | Li | G06N 20/00 |
| 2019/0361843 | A1* | 11/2019 | Stoddard | G06F 16/1834 |
| 2019/0386969 | A1* | 12/2019 | Verzun | G06F 21/606 |
| 2020/0013128 | A1* | 1/2020 | Benkreira | G06F 21/32 |
| 2020/0027297 | A1 | 1/2020 | Obradovic et al. | |
| 2020/0057994 | A1* | 2/2020 | Hunn | G06Q 10/10 |
| 2020/0058023 | A1* | 2/2020 | Travizano | H04L 9/3239 |
| 2020/0082362 | A1* | 3/2020 | Hearn | H04L 9/3239 |
| 2020/0185070 | A1* | 6/2020 | Dahmani | G06Q 20/08 |
| 2020/0250633 | A1* | 8/2020 | Vinson | G06Q 20/3676 |
| 2020/0260147 | A1* | 8/2020 | Madisetti | G06F 16/1824 |
| 2020/0279328 | A1* | 9/2020 | Zhiri | G06Q 20/3678 |
| 2020/0356965 | A1* | 11/2020 | Sharma | G06Q 20/4016 |
| 2021/0075623 | A1* | 3/2021 | Petersen | H04L 9/3297 |
| 2021/0176072 | A1* | 6/2021 | Chalkias | H04L 9/50 |
| 2021/0201328 | A1* | 7/2021 | Gunther | G06Q 30/018 |
| 2021/0233070 | A1* | 7/2021 | Malene | G06Q 20/223 |
| 2021/0336786 | A1* | 10/2021 | Li | G06F 21/16 |
| 2021/0365662 | A1* | 11/2021 | Chen | G06F 3/041 |
| 2022/0129899 | A1* | 4/2022 | Vinson | G06Q 20/38215 |
| 2022/0198418 | A1* | 6/2022 | Kang | G06Q 30/06 |
| 2022/0207022 | A1* | 6/2022 | Wood | G06F 16/2379 |
| 2023/0005088 | A1* | 1/2023 | Phipps | G06Q 50/18 |
| 2023/0014113 | A1* | 1/2023 | Vijayaraghavan | H04L 9/50 |
| 2023/0186418 | A1* | 6/2023 | Spangenberg | G06Q 40/04 705/80 |
| 2023/0206219 | A1* | 6/2023 | Khuong | G06Q 20/3825 705/75 |
| 2023/0206363 | A1* | 6/2023 | Spaling | G06Q 50/18 705/311 |
| 2023/0267192 | A1* | 8/2023 | Mesrsmid | G06F 21/32 726/6 |
| 2023/0267517 | A1* | 8/2023 | Solaru | G06Q 20/102 705/7.25 |
| 2023/0342790 | A1* | 10/2023 | Ware | G06Q 30/0185 |
| 2023/0368136 | A1* | 11/2023 | Patel | G16H 40/20 |
| 2023/0401555 | A1* | 12/2023 | Eby | H04L 9/0637 |
| 2024/0031159 | A1 | 1/2024 | Bakshi et al. | |
| 2024/0070627 | A1* | 2/2024 | Galterio | G06Q 20/36 |
| 2025/0278731 | A1* | 9/2025 | Lei | G06Q 20/34 |

FOREIGN PATENT DOCUMENTS

| | | | | | |
|---|---|---|---|---|---|
| KR | 20090006860 | A | * | 1/2009 | B62D 9/005 |
| KR | 20090006860 | U | * | 7/2009 | A01K 97/08 |
| KR | 20200013128 | A | * | 2/2020 | G06N 20/00 |
| KR | 20200057994 | A | * | 5/2020 | A23L 5/13 |
| KR | 20200058023 | A | * | 5/2020 | H01M 8/241 |
| KR | 20200082362 | A | * | 7/2020 | C21D 8/0426 |
| KR | 20210075623 | A | * | 6/2021 | C07C 211/54 |
| KR | 20220129899 | A | * | 9/2022 | H05K 1/115 |
| WO | WO-2018026727 | A1 | * | 2/2018 | G06Q 30/0185 |
| WO | WO-2020036657 | A1 | * | 2/2020 | H04L 9/0618 |
| WO | WO-2021054989 | A1 | * | 3/2021 | H04L 9/50 |
| WO | WO-2021154981 | A1 | * | 8/2021 | G06Q 20/065 |
| WO | WO-2023182798 | A1 | * | 9/2023 | G06Q 30/0236 |
| WO | WO-2024009257 | A1 | * | 1/2024 | G06Q 30/0619 |

* cited by examiner

GENERATING SMART CONTRACTS FOR ELECTRONIC NOTARIZATION USING SYNTHETICALLY GENERATED INVISIBLE FINGERPRINT METADATA

BACKGROUND

Aspects of the disclosure generally relate to one or more computer systems, servers, and/or other devices including hardware and/or software. In particular, one or more aspects of the disclosure relate to generating smart contracts for electronic notarization using synthetically generated invisible fingerprint metadata.

Electronic notarization (E-Notarization), also known as remote online notarization (RON), is a process of notarizing a document remotely in electronic form (e.g., through the use of electronic signature, identity verification, and/or audio-visual technologies). A typical electronic notarization process involves knowledge-based authentication (KBA), credential analysis, and remote presentation. In many instances, users are asked to upload documents and personal information online, and this data may be stored in a data store. By sharing private data, concerns arise around data privacy breach that inhibit users from desiring to use electronic notarization. In many instances, it may be difficult to ensure privacy and security of data when using current electronic notarization mechanisms.

SUMMARY

Aspects of the disclosure provide effective, efficient, scalable, and convenient technical solutions that address and overcome the technical problems associated with electronic notarization, including ensuring data privacy and security. In accordance with one or more embodiments, an apparatus having at least one processor and memory may receive synthetic fingerprint information. In addition, the synthetic fingerprint information may be generated based on one or more physical fingerprint images of a user and using a generative artificial intelligence algorithm. The apparatus may receive one or more digital documents associated with an electronic notarization. The apparatus may receive rule information corresponding to location specific protocols associated with the electronic notarization. The apparatus may generate a smart contract on a blockchain based on the synthetic fingerprint information, the one or more digital documents, and the rule information.

In some embodiments, generating the smart contract may include embedding the synthetic fingerprint information with the one or more digital documents.

In some arrangements, the apparatus may transmit the smart contract to a node in a decentralized finance repository.

In some embodiments, the apparatus may identify a discrepancy in the smart contract and send a notification of the discrepancy.

In some embodiments, receiving the synthetic fingerprint information may include receiving one or more synthetic fingerprint images associated with the one or more physical fingerprint images of the user.

In some examples, receiving the one or more digital documents associated with the electronic notarization may include receiving the one or more digital documents transmitted from an extended reality capable device.

In some embodiments, retrieving the rule information corresponding to location specific protocols associated with the electronic notarization may include identifying state laws and regulations associated with the electronic notarization.

In some example arrangements, the smart contract may be generated based on a blockchain-based smart contract token standard.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to intelligent solutions for electronic notarization, including generating synthetic invisible fingerprints for metadata security and document verification using generative artificial intelligence (AI), generating smart contracts for electronic notarization using synthetically generated invisible fingerprint metadata, and automatic tagging of smart contracts for electronic notarization in a decentralized finance system. In particular, one or more aspects of the disclosure may employ synthetic fingerprinting and generative artificial intelligence for metadata security and document verification. Additional aspects of the disclosure may utilize the synthetic fingerprints for programming a smart contract. Additional aspects of the disclosure may map incoming digital documents with protocol checklists and intelligently alert users of any discrepancies for electronic notarization. Further aspects of the disclosure may automatically tag the smart contracts with synthetic fingerprints for electronic notarization. The synthetic fingerprints may be made invisible for detection using internet of things (IoT) metadata transmission. Further aspects of the disclosure may allow generated smart contracts to be updated, modified, or transferred in a secure digital ecosystem such as a decentralized multi-chain finance platform.

Figure 1A:
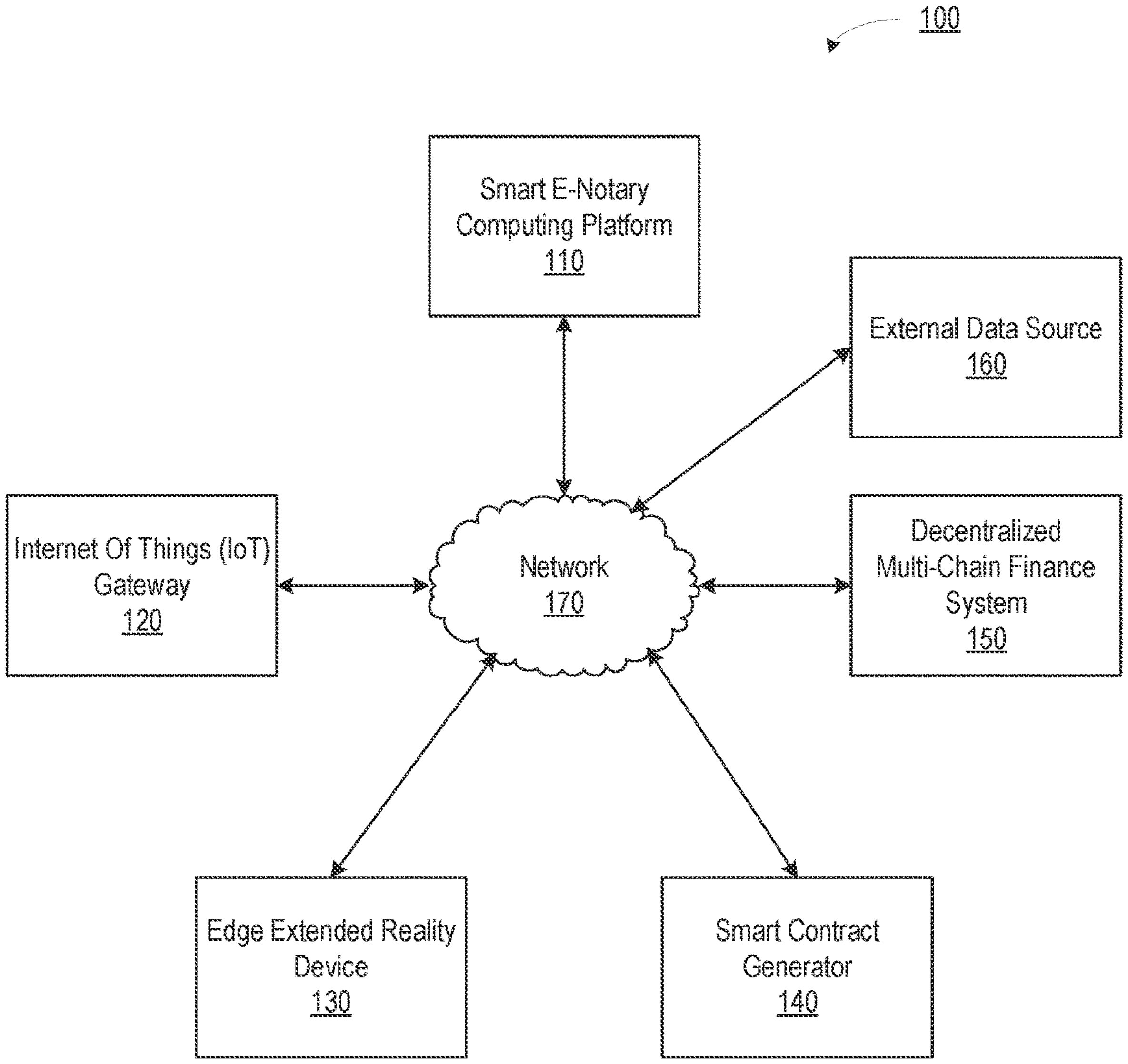
FIGS. 1A and 1B depict an illustrative computing environment for generating synthetic invisible fingerprints for metadata security and document verification using generative artificial intelligence (AI), generating smart contracts for electronic notarization using synthetically generated invisible fingerprint metadata, and/or automatic tagging of smart contracts for electronic notarization in a decentralized finance system in accordance with one or more example embodiments.
Figure 1B:
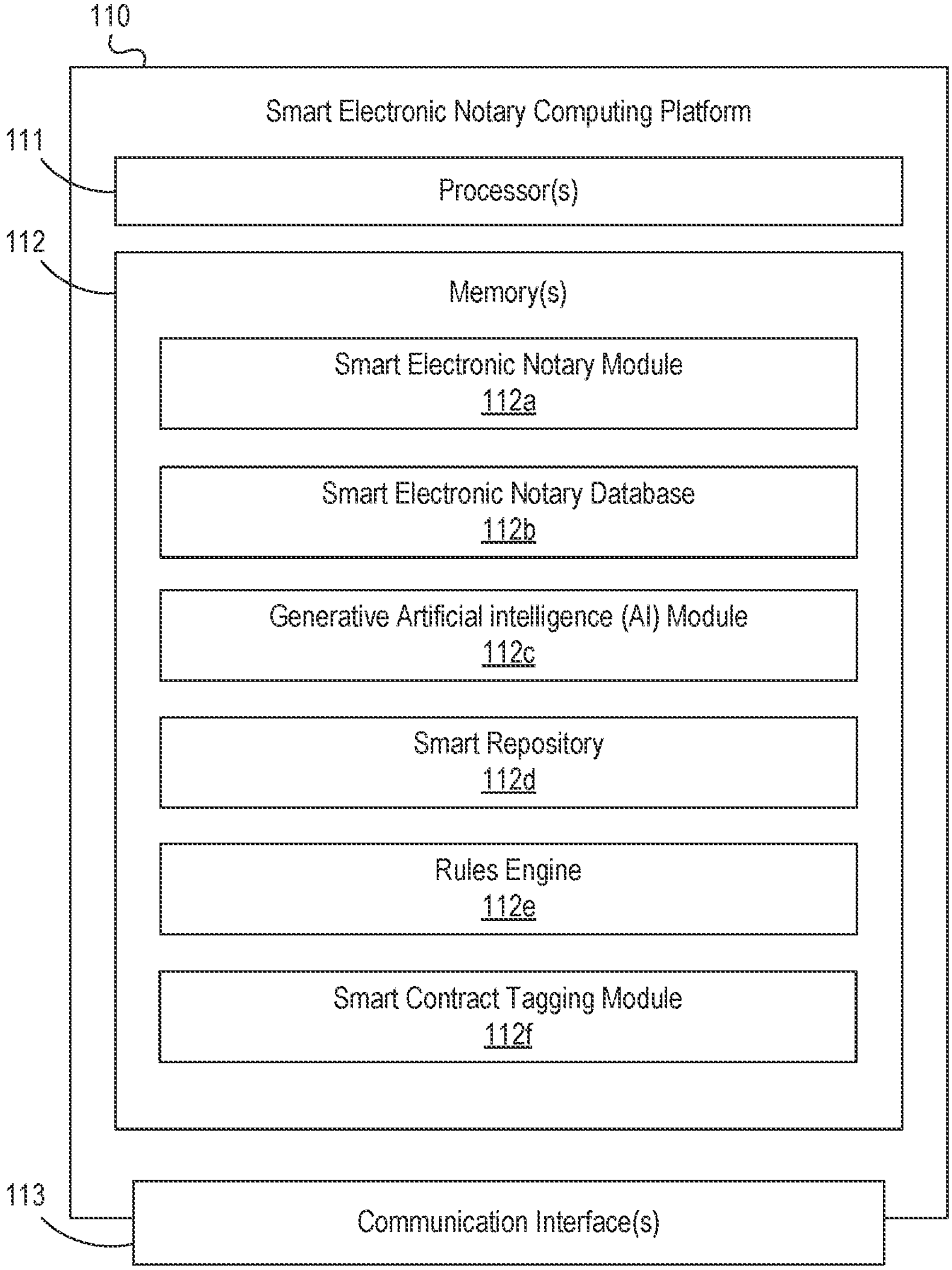

FIGS. 1A and 1B depict an illustrative computing environment generating synthetic invisible fingerprints for metadata security and document verification using generative artificial intelligence (AI), generating smart contracts for electronic notarization using synthetically generated invisible fingerprint metadata, and automatic tagging of smart contracts for electronic notarization in a decentralized finance system in accordance with one or more example embodiments. Referring to FIG. 1A, computing environment 100 may include one or more computing devices and/or other computing systems. For example, computing environment 100 may include smart e-notary computing platform 110, internet of things (IoT) gateway 120, edge extended reality device 130, smart contract generator 140, decentralized multi-chain finance system 150, and external data source 160.

As illustrated in greater detail below, smart e-notary computing platform 110 may be a computer system that includes one or more computing devices (e.g., servers, server blades, or the like) and/or other computer components (e.g., processors, memories, communication interfaces) configured to perform one or more of the functions described herein. For example, smart e-notary computing platform 110 may include one or more computers that may be used to generate synthetic invisible fingerprints for metadata security and document verification using generative artificial intelligence (AI), generate smart contracts for electronic notarization using synthetically generated invisible fingerprint metadata, and automatically tag smart contracts for electronic notarization in a decentralized finance system. In some instances, the smart e-notary computing platform 110 may be maintained by an enterprise organization (e.g., a financial institution, or the like).

Internet of things (IoT) gateway 120 may be a hardware device or a software service that provides a medium for device-to-device communication or device-to-cloud communication. Internet of things gateway 120 may provide security and an administrative interface to ensure that fingerprints are securely captured and transmitted. In some examples, internet of things gateway 120 may store fingerprints during a processing period until the fingerprints are encoded, for example with quantum key distribution (QKD), for transmission security.

Edge extended reality device 130 may include one or more computing devices and/or other computer components (e.g., processors, memories, communication interfaces). Edge extended reality device 130 may be configured to modify a user experience by creating a virtual environment (e.g., virtual reality), adding to user surroundings (e.g., augmented reality), or both (e.g., mixed reality). Edge extended reality device 130 may provide users from remote locations with an extended immersive environment for an on-premise experience. In some examples, fingerprints may be scanned and collected using edge extended reality device 130. In some examples, documents may be collected and retrieved from edge extended reality device 130.

Smart contract generator 140 may, for example, create, manage, provide access to, and/or otherwise maintain smart contracts. In some examples, the smart contracts may be embedded with generative AI digital signatures and comply with local and/or state defined protocols (e.g., processes or rules for legal documentation).

Decentralized multi-chain finance system 150, also referred to as a decentralized finance (DeFi) system, may be and/or include a decentralized network of computers (e.g., nodes). Decentralized multi-chain finance system 150 may use distributed ledger technology, such as blockchain technology, to manage financial transactions. For example, information is stored on a blockchain and distributed among multiple nodes. As decentralized finance is facilitated by blockchain technology, the information is immutable (e.g., tamperproof), making financial transactions secure and auditable.

External data source 160 may, for example, create, store, manipulate, manage, provide access to, and/or otherwise maintain rules information. For example, external data source 160 may store rules and regulations relating to compliance with government regulations. In some examples, smart contract generator 140 may ingest rules and regulations from external data source 160 for creating smart contracts.

Computing environment 100 also may include one or more networks, which may interconnect one or more of smart e-notary computing platform 110, internet of things gateway 120, edge extended reality device 130, smart contract generator 140, decentralized multi-chain finance system 150, external data source 160, or the like. For example, computing environment 100 may include a network 170 (which may interconnect, e.g., smart e-notary computing platform 110, internet of things gateway 120, edge extended reality device 130, smart contract generator 140, decentralized multi-chain finance system 150, external data source 160, and/or one or more other systems which may be associated with an enterprise organization, such as a financial institution, with one or more other systems, public networks, sub-networks, and/or the like).

In one or more arrangements, smart e-notary computing platform 110, internet of things gateway 120, edge extended reality device 130, smart contract generator 140, decentralized multi-chain finance system 150, and external data source 160 may be any type of computing device capable of receiving a user interface, receiving input via the user interface, and communicating the received input to one or more other computing devices. For example, smart e-notary computing platform 110, internet of things gateway 120, edge extended reality device 130, smart contract generator 140, decentralized multi-chain finance system 150, external data source 160, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions as described herein.

Referring to FIG. 1B, smart e-notary computing platform 110 may include one or more processor(s) 111, memory(s) 112, and communication interface(s) 113. A data bus may interconnect processor 111, memory 112, and communication interface 113. Communication interface 113 may be a network interface configured to support communication between smart e-notary computing platform 110 and one or more networks (e.g., network 170, or the like). Memory 112 may include one or more program modules having instructions that when executed by processor 111 cause smart e-notary computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of smart e-notary computing platform 110 and/or by different computing devices that may form and/or otherwise make up smart e-notary computing platform 110. For example, memory 112 may have, store, and/or include a smart electronic notary module 112*a*, a smart electronic notary database 112*b*, a generative artificial intelligence (AI) module 112*c*, a smart repository 112*d*, a rules engine 112*e*, and a smart contract tagging module 112*f*.

Smart electronic notary module 112*a* may have instructions that direct and/or cause smart e-notary computing platform 110 to generate synthetic invisible fingerprints for metadata security and document verification using generative artificial intelligence (AI), generate smart contracts for electronic notarization using synthetically generated invisible fingerprint metadata, automatically tag smart contracts for electronic notarization in a decentralized finance system, and/or perform other functions, as discussed in greater detail below. Smart electronic notary database 112*b* may store information used by smart electronic notary module 112*a* and/or smart e-notary computing platform 110 in generating synthetic invisible fingerprints for metadata security and document verification using generative artificial intelligence (AI), generating smart contracts for electronic notarization using synthetically generated invisible fingerprint metadata, automatically tagging smart contracts for electronic notarization in a decentralized finance system, and/or in performing other functions. Generative AI module 112*c* may have instructions that direct and/or cause smart e-notary computing platform 110 to create systematic and iterative rational datasets based on input data, such as using actual existing fingerprints and user information to generate new content and information for synthetic processing. For example, a generative AI algorithm may identify an underlying pattern of data to generate a new dataset (e.g., a similar plausible dataset). Smart repository 112*d* may be and/or include a protected data store used to store encoded fingerprint samples. In some examples, the fingerprint samples may be stored based on predefined categories. Rules engine 112*e* may store instructions and/or data that may cause or enable smart e-notary computing platform 110 to ensure verification of legal documents with defined metadata checks, identify local and/or state defined protocols (e.g., policies, procedures, guidelines, or the like), and notify users of any discrepancies or take other appropriate actions. Smart contract tagging module 112*f* may have instructions that direct and/or cause smart e-notary computing platform 110 to automatically and electronically tag smart contracts and/or perform other functions, as discussed in greater detail below.

Figure 2A:
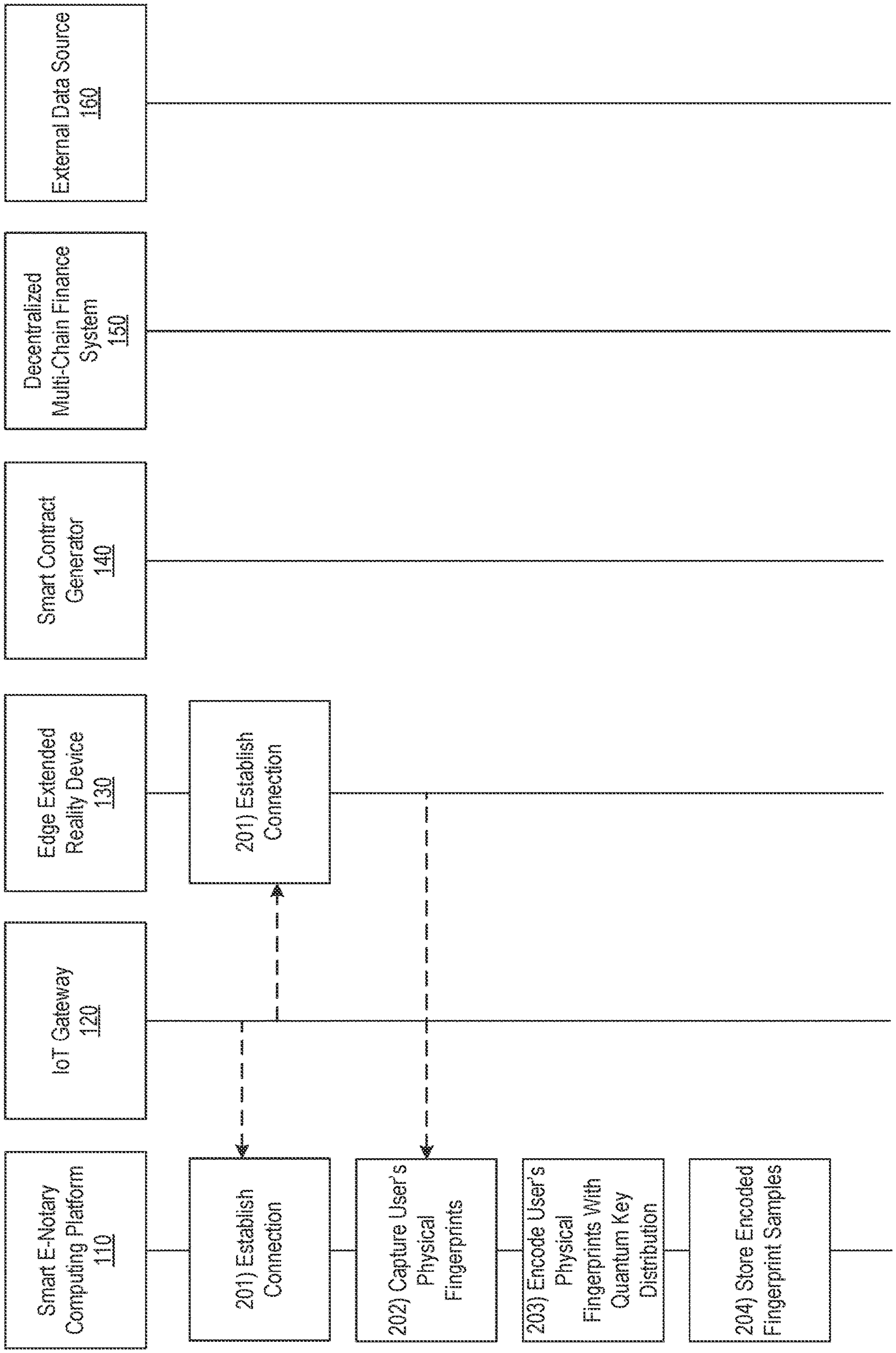
FIGS. 2A-2B depict an illustrative event sequence for generating synthetic invisible fingerprints for metadata security and document verification using generative artificial intelligence (AI) in accordance with one or more example embodiments.
Figure 2B:
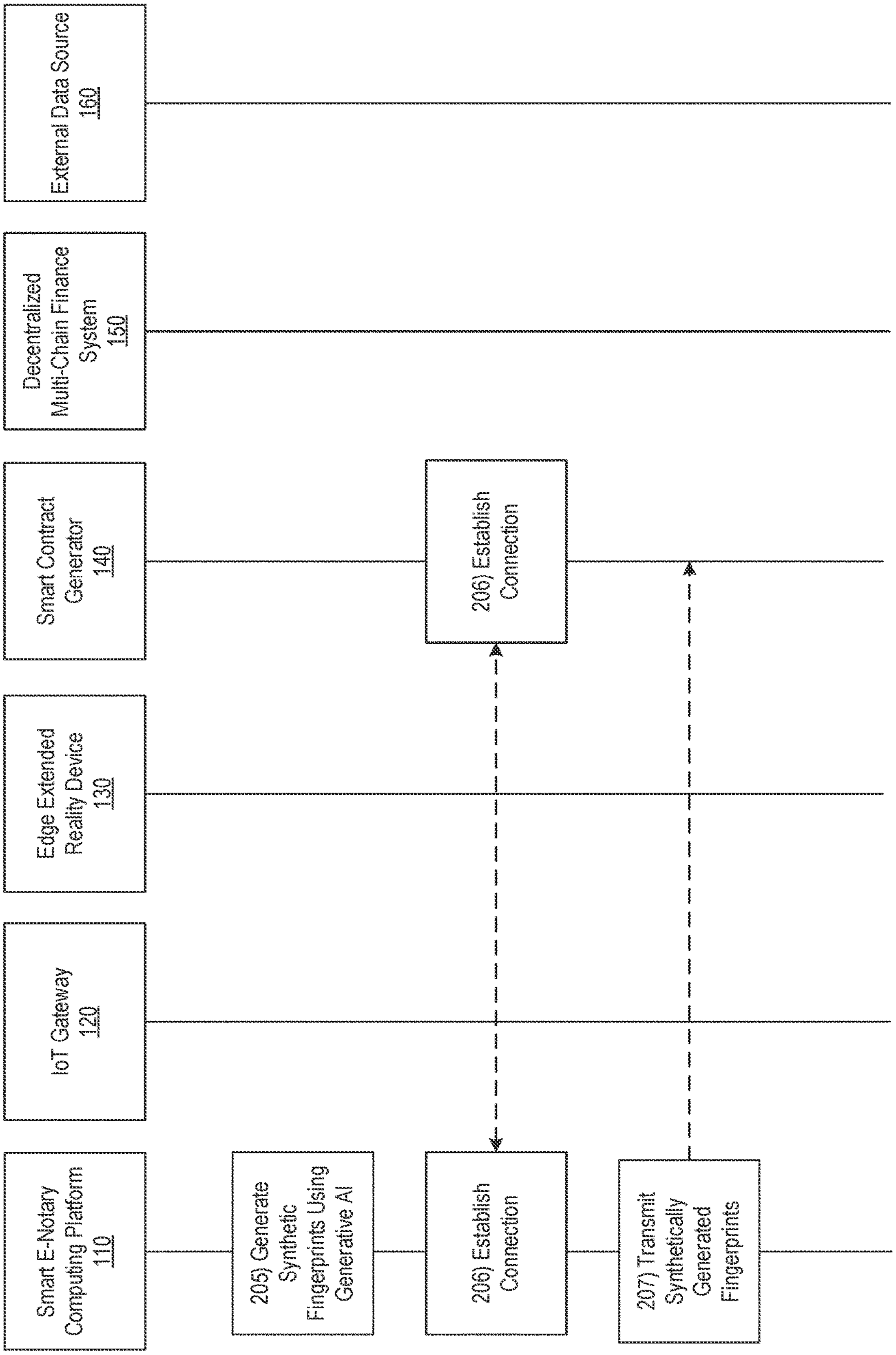

Generally, FIGS. 2A-2G depict an illustrative event sequence for electronic notarization including enhanced data privacy and security in accordance with one or more example embodiments. FIGS. 2A-2B depict an illustrative event sequence for generating synthetic invisible fingerprints for metadata security and document verification using generative artificial intelligence (AI) in accordance with one or more example embodiments. Referring to FIG. 2A, at step 201, smart e-notary computing platform 110 may establish a connection with edge extended reality device 130 via a gateway server (e.g., IoT gateway 120). For example, smart e-notary computing platform 110 may establish a wireless data connection with edge extended reality device 130 to link smart e-notary computing platform 110 with edge extended reality device 130 via a gateway server (e.g., IoT gateway 120). In some instances, smart e-notary computing platform 110 may identify whether or not a connection is already established with edge extended reality device 130. If a connection is already established with edge extended reality device 130, smart e-notary computing platform 110 might not re-establish the connection. If a connection is not yet established with the edge extended reality device 130, smart e-notary computing platform 110 may establish the wireless data connection as described above.

At step 202, smart e-notary computing platform 110 may capture, via a computing device, first fingerprint information that includes one or more actual physical or biological fingerprint images of a user. The user may be, for example, a user seeking electronic notary services. The user may, from a remote location, provide documents and inputs for identity validation, verification, and/or authentication, such as a driver's license, passport, government-issued identification, or other identification document. In some examples, the physical fingerprint images of a user may be scanned and collected in an extended immersive environment that simulates physical presence, for instance, by using an extended reality capable device (e.g., edge extended reality device 130) having a biometric sensor (e.g., fingerprint sensor). The fingerprint scan may be conducted in various different directions (e.g., horizontal, vertical, at an angle, etc.).

At step 203, smart e-notary computing platform 110 may encode the first fingerprint information in accordance with a quantum key distribution (QKD) scheme or other quantum encryption technique. For instance, the first fingerprint information may be encoded with quantum key distribution to ensure data security. In addition, with quantum key distribution, the uniqueness of authentication credentials may be verified without compromising the security of the authentication credentials.

At step 204, smart e-notary computing platform 110 may store the encoded first fingerprint information (e.g., QKD encoded physical fingerprint samples) in a secure data store (e.g., in smart repository 112*d*). In some examples, smart e-notary computing platform 110 may store the encoded first fingerprint information based on one or more predefined indexed categories, which may, for example, allow for faster data extraction.

Referring to FIG. 2B, at step 205, smart e-notary computing platform 110 may leverage generative AI to generate second (e.g., new, synthetic) fingerprint information based on (e.g., utilizing) the encoded first (e.g., actual physical or biological) fingerprint information. Generative AI describes a type of artificial intelligence that uses unsupervised learning algorithms to create new digital images, video, audio, text, or code. With generative AI, smart e-notary computing platform 110 may detect an underlying pattern related to the encoded first fingerprint information and produce similar content (e.g., fingerprint regeneration using QKD encoded fingerprint samples to generate synthetic fingerprints resembling actual user fingerprints). The synthetic or second fingerprint information uniquely identifies the user, similar to a physical or biological fingerprint.

At step 206, smart e-notary computing platform 110 may establish a connection with smart contract generator 140. For example, smart e-notary computing platform 110 may establish a wireless data connection with smart contract generator 140 to link smart e-notary computing platform 110 with smart contract generator 140. In some instances, smart e-notary computing platform 110 may identify whether or not a connection is already established with smart contract generator 140. If a connection is already established with smart contract generator 140, smart e-notary computing platform 110 might not re-establish the connection. If a connection is not yet established with the smart contract generator 140, smart e-notary computing platform 110 may establish the wireless data connection as described above.

At step 207, smart e-notary computing platform 110 may transmit the second fingerprint information (e.g., synthetically generated fingerprints) and cause generation of a smart contract on a blockchain based on the second fingerprint information. In some examples, the second fingerprint information may be transmitted as data packets to a smart contract generator (e.g., smart contract generator 140) via an internet of things (IoT) device-to-device (D2D) communication channel. Advantageously, transmitting the second fingerprint information in this way allows the synthetic fingerprints to be made invisible for detection during transmission (e.g., to smart contract generator 140), enhancing data privacy and security.

Figure 2C:
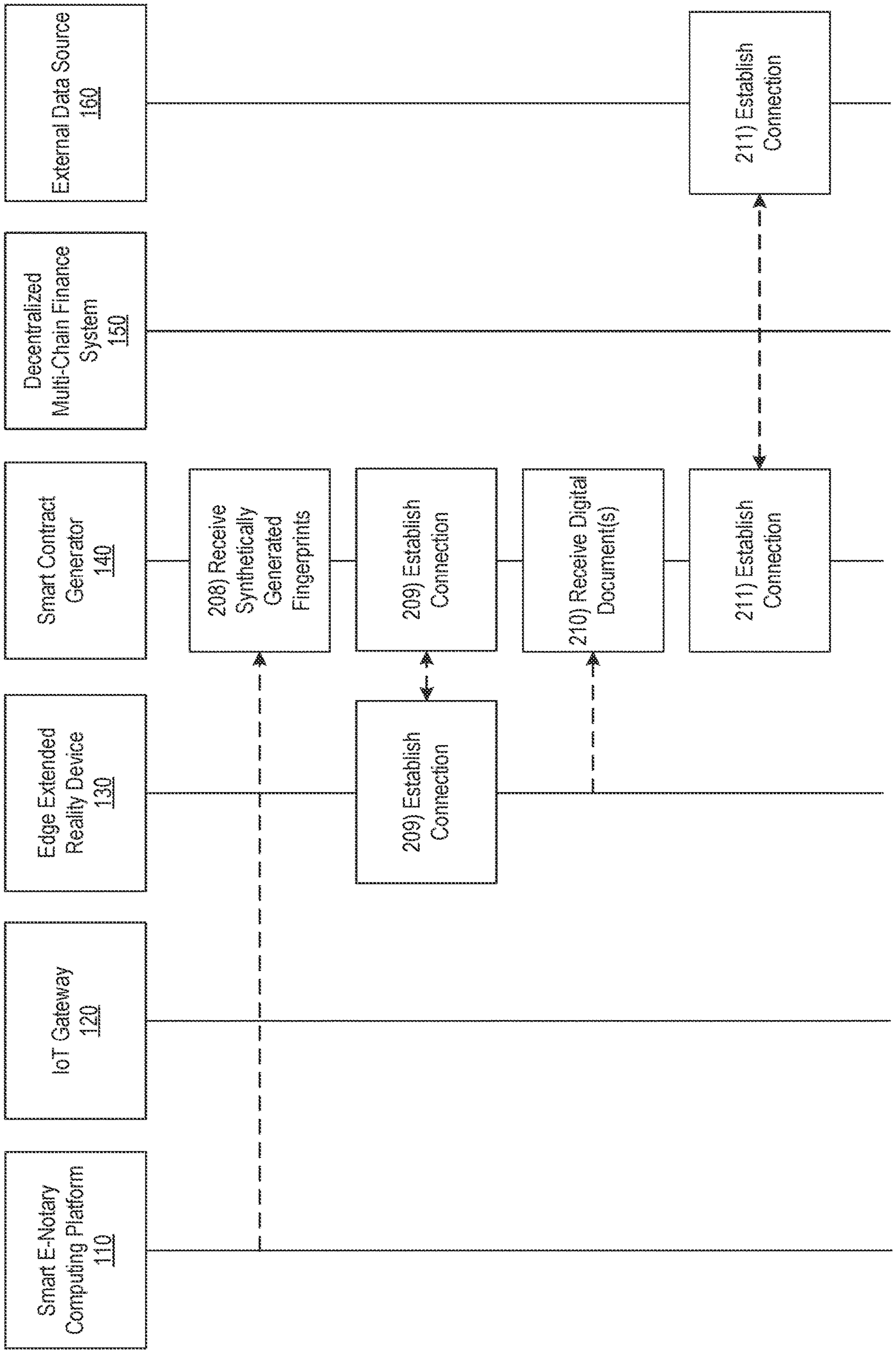
FIGS. 2C-2E depict an illustrative event sequence for generating smart contracts for electronic notarization using synthetically generated invisible fingerprint metadata in accordance with one or more example embodiments.
Figure 2D:
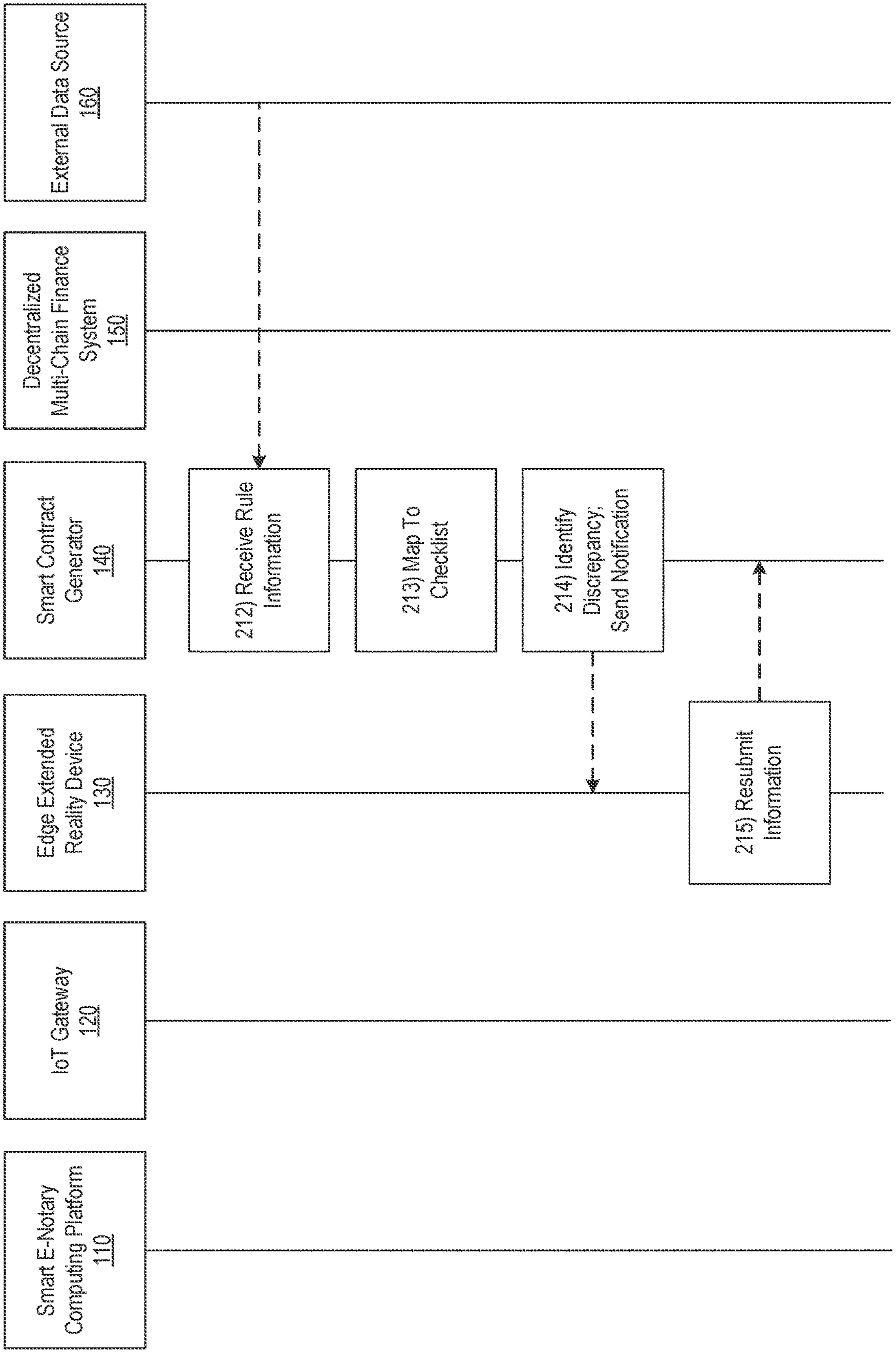
Figure 2E:
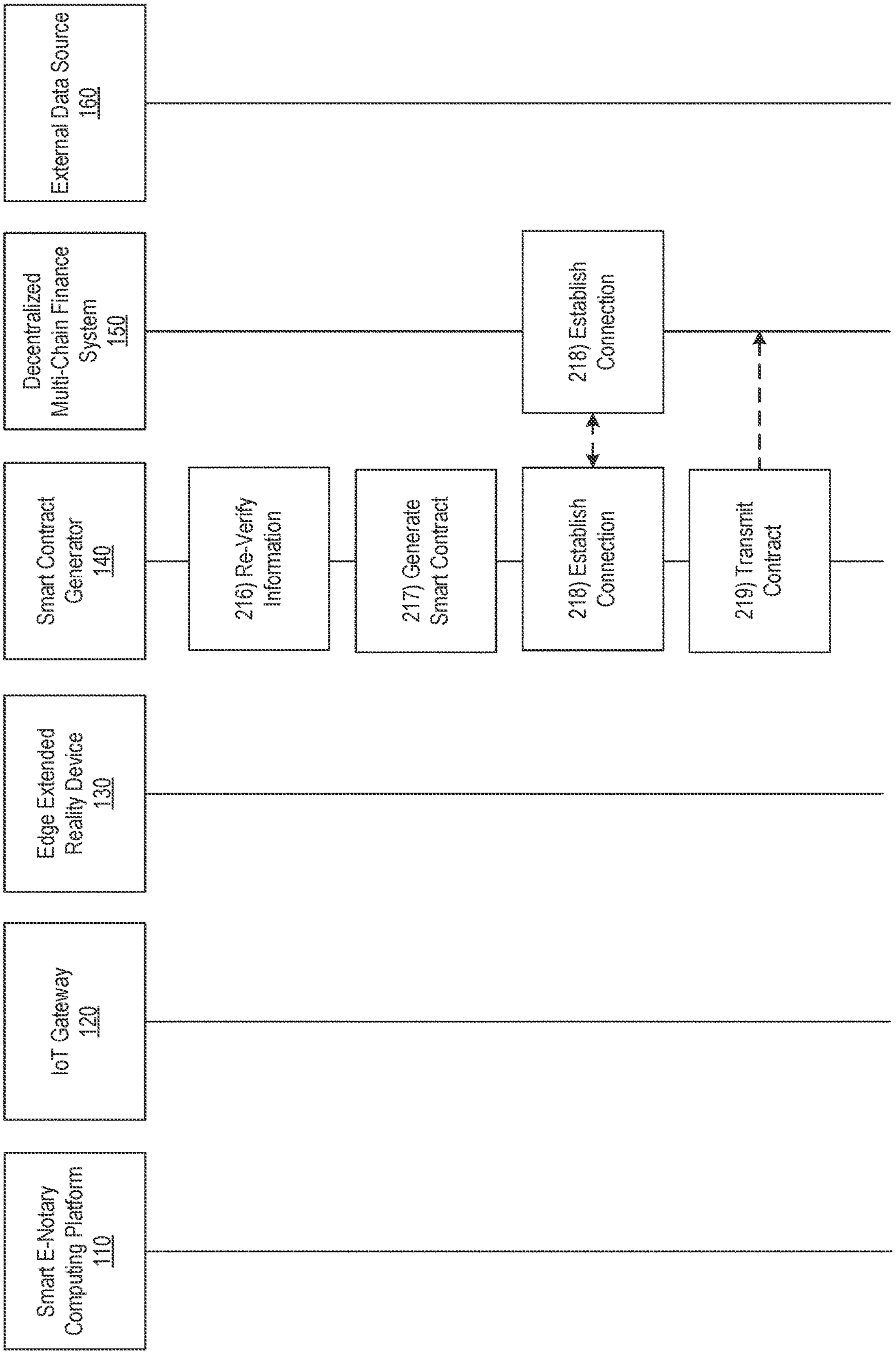

FIGS. 2C-2E depict an illustrative event sequence for generating smart contracts for electronic notarization using synthetically generated invisible fingerprint metadata in accordance with one or more example embodiments. Referring to FIG. 2C, at step 208, smart e-notary computing platform 110 may receive synthetic fingerprint information. In addition, the synthetic fingerprint information may be generated based on one or more physical fingerprint images of a user and using a generative artificial intelligence algorithm (e.g., as described in FIGS. 2A-B).

At step 209, smart contract generator 140 may establish a connection with edge extended reality device 130. For example, smart contract generator 140 may establish a wireless data connection with edge extended reality device 130 to link smart contract generator 140 with edge extended reality device 130. In some instances, smart contract generator 140 may identify whether or not a connection is already established with edge extended reality device 130. If a connection is already established with edge extended reality device 130, smart contract generator 140 might not re-establish the connection. If a connection is not yet established with the edge extended reality device 130, smart contract generator 140 may establish the wireless data connection as described above.

At step 210, smart contract generator 140 may receive one or more digital documents associated with an electronic notarization. For example, smart contract generator 140 may receive the one or more digital documents transmitted from an extended reality capable device (e.g., edge extended reality device 130). The digital documents may include identification documents, agreement documents, legal documents, or other documents that might be required for electronic notarization.

At step 211, smart contract generator 140 may establish a connection with external data source 160. For example, smart contract generator 140 may establish a wireless data connection with external data source 160 to link smart contract generator 140 with external data source 160. In some instances, smart contract generator 140 may identify whether or not a connection is already established with external data source 160. If a connection is already established with external data source 160, smart contract generator 140 might not re-establish the connection. If a connection is not yet established with the external data source 160, smart contract generator 140 may establish the wireless data connection as described above.

Referring to FIG. 2D, at step 212, smart contract generator 140 may receive rule information corresponding to location specific protocols (e.g., state defined protocols) associated with the electronic notarization. For example, smart contract generator 140 may retrieve the rule information from an external data source (e.g., external data source 160). The rule information may identify state laws, rules, and regulations associated with the electronic notarization. For instance, in the case of a transfer of rights involving two different states, smart contract generator 140 may take into account, in real-time, the laws, rules, and regulations corresponding to the different states and ensure that they are abided by.

In some embodiments, at step 213, smart contract generator 140 may map incoming digital documents (e.g., from step 210) with a checklist to verify compliance with state laws, rules, and regulations (e.g., from step 212). At step 214, smart contract generator 140 may identify a discrepancy or inconsistency in the smart contract (e.g., a discrepancy in identity) and send a notification of the discrepancy or missing documentation (e.g., to edge extended reality device 130). For example, smart contract generator 140 may send a notification requesting users to update documentation as per the checklist within a predefined period of time. In some examples, smart contract generator 140 may determine whether the discrepancy is an error or fraud. At step 215, a user may resubmit documentation or other requested information for reverification. In turn, referring to FIG. 2E, at step 216, smart contract generator 140 may reverify the resubmitted information.

At step 217, smart contract generator 140 may generate a smart contract on a blockchain based on the synthetic fingerprint information (e.g., from step 208), the one or more digital documents (e.g., from step 210), and the rule information (e.g., from step 212). The smart contract may be programmatically generated based on a blockchain-based smart contract token standard. In generating the smart contract, smart contract generator 140 may embed the synthetic fingerprint information with the one or more digital documents.

At step 218, smart contract generator 140 may establish a connection with decentralized multi-chain finance system 150. For example, smart contract generator 140 may establish a wireless data connection with decentralized multi-chain finance system 150 to link smart contract generator 140 with decentralized multi-chain finance system 150. In some instances, smart contract generator 140 may identify whether or not a connection is already established with decentralized multi-chain finance system 150. If a connection is already established with decentralized multi-chain finance system 150, smart contract generator 140 might not re-establish the connection. If a connection is not yet established with the decentralized multi-chain finance system 150, smart contract generator 140 may establish the wireless data connection as described above.

At step 219, smart contract generator 140 may transmit the smart contract to a node (e.g., a node "x") in a decentralized finance repository (e.g., to decentralized multi-chain finance system 150). Thereby, the smart contract may be stored and executed on a distributed ledger system (e.g., blockchain).

Figure 2F:
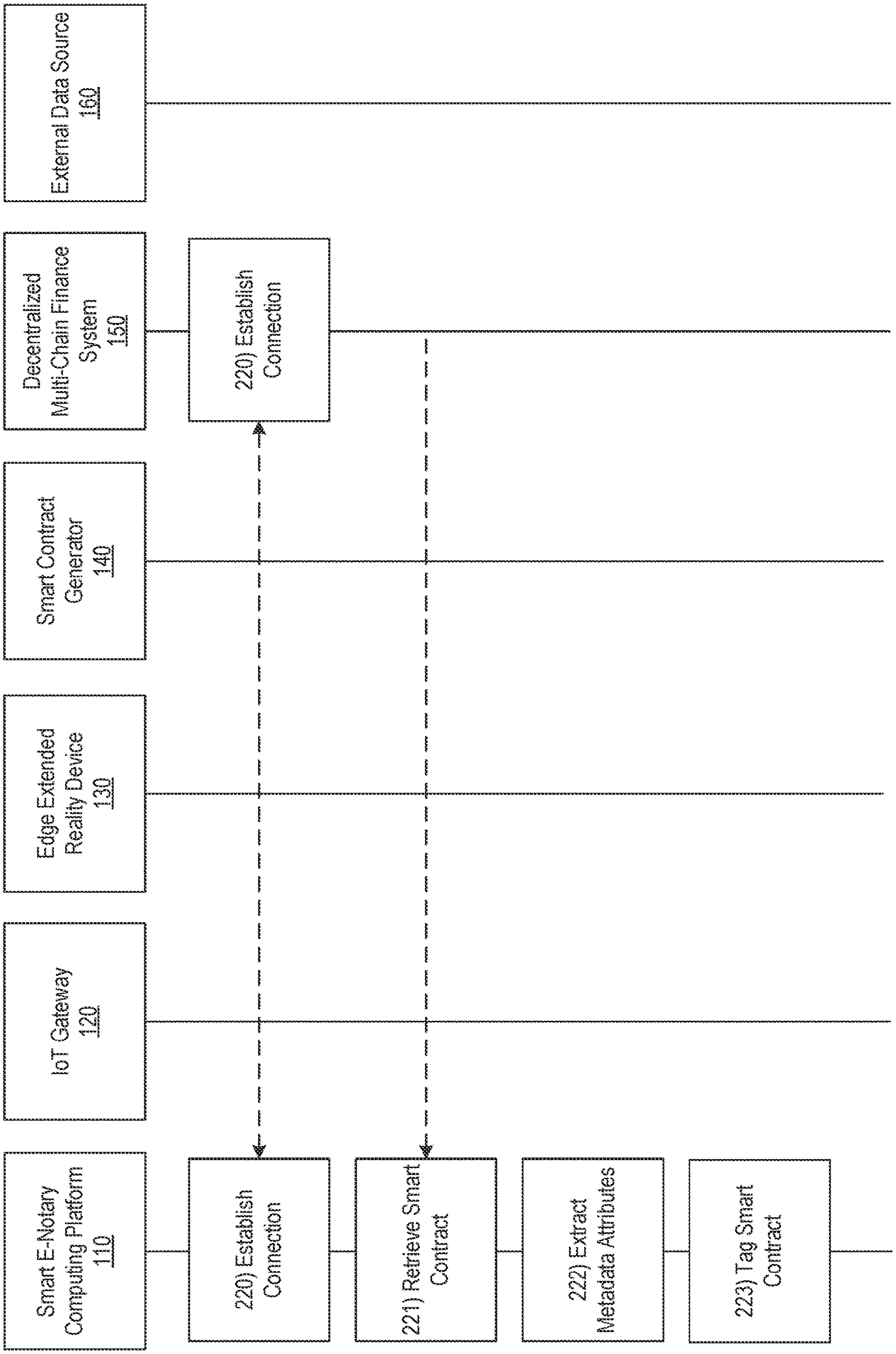
FIGS. 2F-2G depict an illustrative event sequence for automatic tagging of smart contracts for electronic notarization in a decentralized finance system in accordance with one or more example embodiments.
Figure 2G:
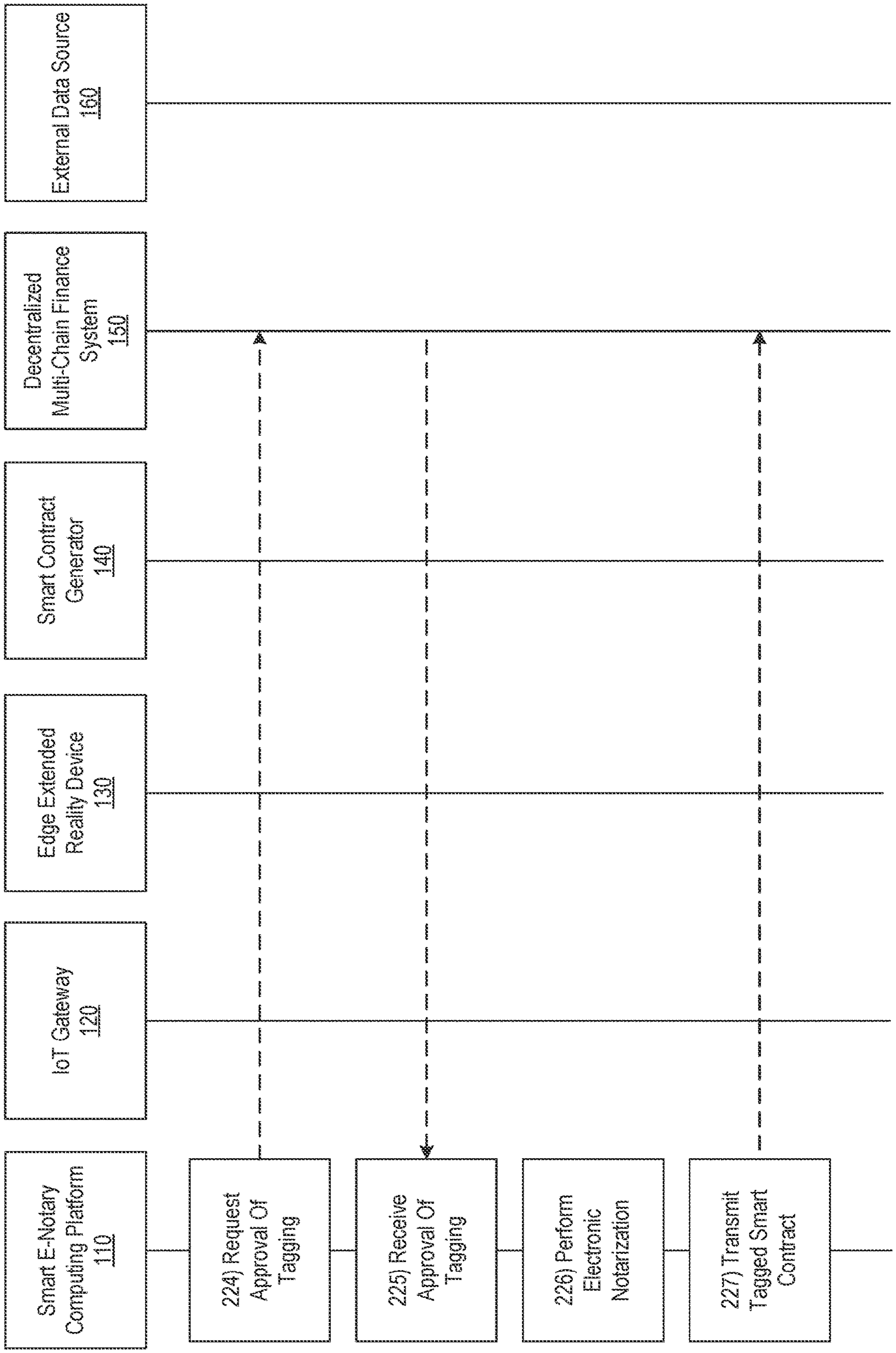

FIGS. 2F-2G depict an illustrative event sequence for automatic tagging of smart contracts for electronic notarization in a decentralized finance system in accordance with one or more example embodiments. Referring to FIG. 2F, at 220, smart e-notary computing platform 110 may establish a connection with decentralized multi-chain finance system 150. For example, smart e-notary computing platform 110 may establish a wireless data connection with decentralized multi-chain finance system 150 to link smart e-notary computing platform 110 with decentralized multi-chain finance system 150. In some instances, smart e-notary computing platform 110 may identify whether or not a connection is already established with decentralized multi-chain finance system 150. If a connection is already established with decentralized multi-chain finance system 150, smart e-notary computing platform 110 might not re-establish the connection. If a connection is not yet established with the decentralized multi-chain finance system 150, smart e-notary computing platform 110 may establish the wireless data connection as described above.

At step 221, smart e-notary computing platform 110 may retrieve, from a node (e.g., a node "x") in a decentralized distributed ledger system, a smart contract associated with a document for remote online notarization. In some examples, the smart contract may be programmatically generated based on a blockchain-based smart contract token standard and may be and/or include a hexadecimal address. In some examples, the smart contract retrieved from the node in the decentralized distributed ledger system may be programmatically generated using synthetically generated fingerprint metadata of the one or more individuals associated with the document for remote online notarization as described above.

At step 222, smart e-notary computing platform 110 may extract one or more metadata attributes from the document. In some examples, the one or more metadata attributes may include a photograph identification or a digital signature. At step 223, smart e-notary computing platform 110 may tag the smart contract based on the extracted one or more metadata attributes. Additionally or alternatively, smart e-notary computing platform 110 may tag the smart contract based on rule information corresponding to location specific protocols.

Referring to FIG. 2G, at step 224, smart e-notary computing platform 110 may request approval of the tagging from one or more individuals associated with the document for remote online notarization (e.g., parties to the smart contract, such as a person selling their property, a contractor constructing a house, a legal officer, etc.). For instance, smart e-notary computing platform 110 may send alerts to the one or more respective individuals via the decentralized multi-chain finance system 150 (e.g., via the decentralized nodes) notifying them of the approval request. At step 225, smart e-notary computing platform 110 may receive approval of the tagging from the one or more individuals associated with the document for remote online notarization. At step 226, based on receiving the requisite approvals, smart e-notary computing platform 110 may digitally notarize the document.

At step 227, smart e-notary computing platform 110 may transmit the tagged smart contract to back to the node (e.g., the node "x") in the decentralized distributed ledger system and cause the tagged smart contract to be saved in the node. In some examples, smart e-notary computing platform 110 may send a notification to the user indicating that the electronic notarization is complete. The user may view, save, or print a copy of the contract for future reference. For any changes or updates to the existing smart contract, an audit trail of the changes may be maintained in the decentralized finance system (e.g., decentralized multi-chain finance system 150).

Figure 3:
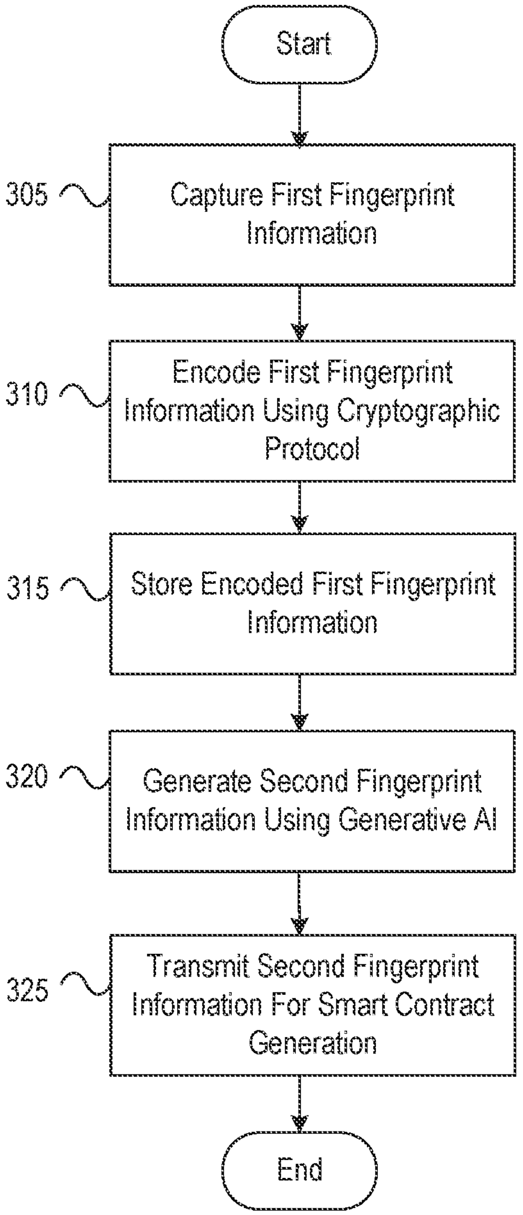
FIG. 3 depicts an illustrative method for generating synthetic invisible fingerprints for metadata security and document verification using generative artificial intelligence (AI) in accordance with one or more example embodiments.

FIG. 3 depicts an illustrative method for generating synthetic invisible fingerprints for metadata security and document verification using generative artificial intelligence (AI) in accordance with one or more example embodiments. Referring to FIG. 3, at step 305, a computing platform having at least one processor, a communication interface, and memory may capture, via a computing device, first fingerprint information. The first fingerprint information may include one or more physical fingerprint images of a user. At step 310, the computing platform may encode the first fingerprint information in accordance with a quantum key distribution scheme. At step 315, the computing platform may store the encoded first fingerprint information in a data store. At step 320, based on the encoded first fingerprint information and using a generative artificial intelligence algorithm, the computing platform may generate second fingerprint information. The second fingerprint information may include one or more synthetic fingerprint images associated with the one or more physical fingerprint images of a user. At step 325, the computing platform may transmit the second fingerprint information for smart contract generation.

Figure 4:
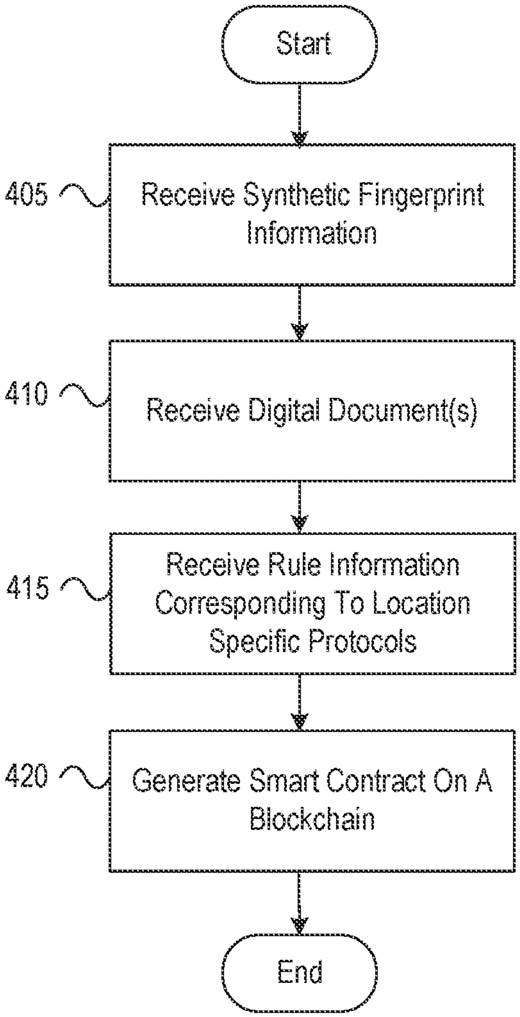
FIG. 4 depicts an illustrative method for generating smart contracts for electronic notarization using synthetically generated invisible fingerprint metadata in accordance with one or more example embodiments.

FIG. 4 depicts an illustrative method for generating smart contracts for electronic notarization using synthetically generated invisible fingerprint metadata in accordance with one or more example embodiments. Referring to FIG. 4, at step 405, an apparatus having at least one processor and memory may receive synthetic fingerprint information. In addition, the synthetic fingerprint information may be generated based on one or more physical fingerprint images of a user and using a generative artificial intelligence algorithm. At step 410, the apparatus may receive one or more digital documents associated with an electronic notarization. At step 415, the apparatus may receive rule information corresponding to location specific protocols associated with the electronic notarization. At step 420, the apparatus may generate a smart contract on a blockchain based on the synthetic fingerprint information, the one or more digital documents, and the rule information.

Figure 5:
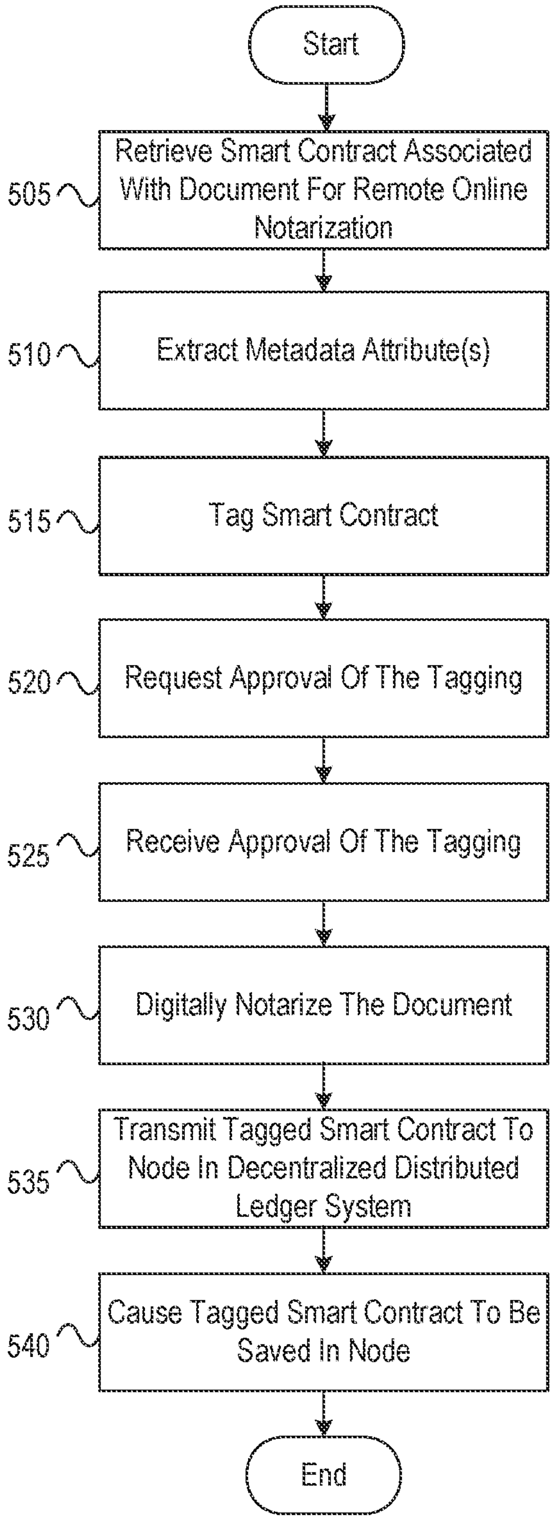
FIG. 5 depicts an illustrative method for automatic tagging of smart contracts for electronic notarization in a decentralized finance system in accordance with one or more example embodiments.

FIG. 5 depicts an illustrative method for automatic tagging of smart contracts for electronic notarization in a decentralized finance system in accordance with one or more example embodiments. Referring to FIG. 5, at step 505, a computing platform having at least one processor, a communication interface, and memory may retrieve, from a node in a decentralized distributed ledger system, a smart contract associated with a document for remote online notarization. At step 510, the computing platform may extract one or more metadata attributes from the document. At step 515, the computing platform may tag the smart contract based on the extracted one or more metadata attributes. At step 520, the computing platform may request approval of the tagging from one or more individuals associated with the document for remote online notarization. At step 525, the computing platform may receive approval of the tagging from the one or more individuals associated with the document for remote online notarization. At step 530, the computing platform may digitally notarize the document. At step 535, the computing platform may transmit the tagged smart contract to the node in the decentralized distributed ledger system. At step 540, the computing platform may cause the tagged smart contract to be saved in the node in the decentralized distributed ledger system.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A notarization and contract generation process comprising:

collecting from a user, via an extended reality capable device, one or more documents associated with an electronic notarization, wherein the extended reality capable device is an edge extended reality device configured to provide the user, from a remote location, with an extended immersive environment for an on-premise experience;

scanning one or more biological fingerprint images from the user via a fingerprint sensor connected to an internet of things (IoT) gateway, wherein the IoT gateway provides a medium for device-to-device communication and stores the one or more scanned biological fingerprint images during a processing period until the fingerprint images are encoded, wherein the one or more scanned biological fingerprint images of the user are encoded with quantum key distribution to enhance data security, and wherein the quantum key distribution encoding enables verification of uniqueness of authentication credentials without compromising security of the authentication credentials;

receiving, by a computing device in communication with the fingerprint sensor, synthetic fingerprint information, and storing the encoded biological fingerprint information in a smart repository based on predefined indexed categories to allow for faster data extraction, wherein the synthetic fingerprint information resemble actual fingerprints of the user and is generated based on the one or more scanned biological fingerprint images of the user and using a generative artificial intelligence algorithm;

transmitting the synthetic fingerprint information as data packets to the smart contract generator via an internet of things (IoT) device-to-device (D2D) communication channel, wherein transmitting the synthetic fingerprint information via the IoT D2D communication channel renders the synthetic fingerprints invisible for detection during transmission, thereby enhancing data privacy and security;

notarizing, by the computing device, the one or more digital documents associated with the electronic notarization;

receiving, by the computing device, the one or more digital documents associated with the electronic notarization;

receiving, by the computing device, rule information corresponding to location specific protocols associated with the electronic notarization;

creating, via the computing device, systematic and iterative rational datasets based on user input data, and identifying an underlying pattern of data to generate a new dataset to ensure verification of the one or more documents associated with the electronic notarization; and generating, by the computing device and a smart contract generator, a smart contract on a blockchain based on the synthetic fingerprint information, the one or more notarized digital documents, and the rule information, and wherein generating the smart contract comprises embedding the synthetic fingerprint information with the one or more digital documents to create tamper-proof metadata, and wherein retrieving the rule information corresponding to location specific protocols further comprises:

identifying state-specific laws, regulations, and procedural compliance rules from a distributed data source in real time, and mapping the rules against the embedded metadata and the one or more digital documents associated with the electronic notarization for validation prior to generating the smart contract, and wherein the smart contract generator is further configured to manage, provide access to, and maintain the generated smart contract.

2. The process of claim 1, further comprising:

transmitting, by the computing device, the smart contract to a node in a decentralized finance repository.

3. The process of claim 1, further comprising:

identifying, by the computing device, a discrepancy in the smart contract; and sending, by the computing device, a notification of the discrepancy.

4. The process of claim 1, wherein receiving the synthetic fingerprint information comprises receiving one or more synthetic fingerprint images associated with the one or more physical fingerprint images of the user.

5. The process of claim 1, wherein the smart contract is generated based on a blockchain-based smart contract token standard.

* * * * *